US010311101B2

(12) United States Patent
Liu

(10) Patent No.: US 10,311,101 B2
(45) Date of Patent: *Jun. 4, 2019

(54) METHODS, SYSTEMS, AND MEDIA FOR SEARCHING FOR VIDEO CONTENT

(71) Applicant: Google Inc., Mountain View, CA (US)

(72) Inventor: Ying Ying Liu, Ann Arbor, MI (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,480

(22) Filed: Jun. 1, 2017

(65) Prior Publication Data

US 2017/0270203 A1   Sep. 21, 2017

Related U.S. Application Data

(63) Continuation of application No. 14/249,554, filed on Apr. 10, 2014, now Pat. No. 9,672,280.

(51) Int. Cl.
*G06F 16/73* (2019.01)
*G06F 16/738* (2019.01)
*G06F 16/783* (2019.01)

(52) U.S. Cl.
CPC ............ *G06F 16/73* (2019.01); *G06F 16/739* (2019.01); *G06F 16/7844* (2019.01)

(58) Field of Classification Search
CPC ......... G06F 17/30796; G06F 17/30823; G06F 17/30843
See application file for complete search history.

(56) References Cited

U.S. PATENT DOCUMENTS

| 6,370,543 B2 | 4/2002 | Hoffert et al. |
| 7,913,280 B1 | 3/2011 | Roberts |
| 8,132,103 B1 | 3/2012 | Chowdhury et al. |
| 9,449,645 B2 * | 9/2016 | Muller ................ G11B 27/031 |

(Continued)

FOREIGN PATENT DOCUMENTS

| EP | 1909195 | 4/2008 |
| JP | 2013021176 | 1/2013 |

(Continued)

OTHER PUBLICATIONS

Alberti, C., et al., "An Audio Indexing System for Election Video Material", In Proceedings of the International Conference on Acoustics, Speech and Signal Processing (ICASSP '09), Apr. 19-24, 2009, Taipei, Taiwan, pp. 4873-4876.

(Continued)

*Primary Examiner* — Richard L Bowen
(74) *Attorney, Agent, or Firm* — Byrne Poh LLP

(57) ABSTRACT

Methods, systems, and media for searching for video content using integrated content sources are provided. In some embodiments, a system for searching for video content is provided, the system comprising: at least one hardware processor that is configured to: receive a search query including at least one search term; identify a plurality of video segments that match the search query, wherein each of the plurality of video segments is associated with a transcript that includes the search term; select a first set of video segments from the plurality of video segments; generate a first composite video by combining the first set of video segments; and cause the first composite video to be presented.

21 Claims, 13 Drawing Sheets

(56) References Cited

U.S. PATENT DOCUMENTS

| | | |
|---|---|---|
| 2007/0118873 A1 | 5/2007 | Houh et al. |
| 2008/0046406 A1 | 2/2008 | Seide et al. |
| 2008/0192840 A1 | 8/2008 | Hua et al. |
| 2009/0319388 A1* | 12/2009 | Yuan ............... G06Q 30/0601 705/26.1 |
| 2010/0014828 A1 | 1/2010 | Sandstrom |
| 2010/0209003 A1 | 8/2010 | Toebes et al. |
| 2010/0251120 A1 | 9/2010 | Chelba |
| 2010/0251291 A1 | 9/2010 | Pino et al. |
| 2011/0246440 A1 | 10/2011 | Kocks et al. |
| 2012/0084283 A1 | 4/2012 | Chitiveli et al. |
| 2012/0114310 A1 | 5/2012 | Hymel et al. |
| 2012/0117046 A1 | 5/2012 | Gunatilake |
| 2012/0198088 A1 | 8/2012 | Yellin et al. |
| 2012/0323897 A1 | 12/2012 | Daher et al. |
| 2013/0004935 A1 | 1/2013 | Smith et al. |
| 2013/0012245 A1 | 1/2013 | Choi |
| 2013/0308922 A1 | 11/2013 | Sano et al. |
| 2014/0164359 A1* | 6/2014 | Jeffery ............... G06F 17/3089 707/722 |
| 2014/0164371 A1 | 6/2014 | Tesch et al. |
| 2014/0214757 A1* | 7/2014 | Kim ............... G06F 17/30029 707/608 |
| 2014/0249813 A1 | 9/2014 | Hoeg |
| 2014/0337372 A1* | 11/2014 | Lee ............... G06F 8/30 707/767 |
| 2015/0293942 A1* | 10/2015 | Cady ............... G06F 17/3028 707/722 |

FOREIGN PATENT DOCUMENTS

| | | |
|---|---|---|
| WO | 2008046406 | 4/2008 |
| WO | WO 2013/021176 | 2/2013 |

OTHER PUBLICATIONS

Havenstein, H., "Google Rolls out Audio Search for YouTube Videos", In Computerworld, Sep. 16, 2008, pp. 1-2, available at: www.computerworld.com/s/article/9114838/Google_rolls_out_audio_search_for_YouTube_videos.
International Preliminary Report on Patentability dated Oct. 20, 2016 in International Patent Application No. PCT/US2015/025440.
International Search Report and Written Opinion dated Jul. 16, 2015 in International Patent Application No. PCT/US2015/025440.
Notice of Allowance dated Feb. 3, 2017 in U.S. Appl. No. 14/249,554.
Office Action dated Apr. 14, 2016 in U.S. Appl. No. 14/249,554.
Office Action dated Sep. 15, 2016 in U.S. Appl. No. 14/249,554.
Office Action dated Nov. 16, 2015 in U.S. Appl. No. 14/249,554.
Examination Report dated Jul. 9, 2018 in EP Patent Application No. 15720236.7.

* cited by examiner

METHODS, SYSTEMS, AND MEDIA FOR SEARCHING FOR VIDEO CONTENT

CROSS-REFERENCE TO RELATED APPLICATION

This application is a continuation of U.S. patent application Ser. No. 14/249,554, filed Apr. 10, 2014, which is hereby incorporated by reference herein in its entirety.

TECHNICAL FIELD

The disclosed subject matter relates to methods, systems, and media for searching for video content. More particularly, the disclosed subject matter relates to searching for and presenting video content responsive to a search query based on audio content associated with the video content.

BACKGROUND

Conventional video search systems (e.g., video search engines, video hosting services, etc.) allow a user to search for videos responsive to a search query based on textual metadata associated with each video (e.g., titles, tags, descriptions, etc.). For example, if a user inputs a search query "Laplace," a conventional video search system returns a list of links to videos with the word "Laplace" contained in their metadata, such as a video entitled "Laplace."

However, such a conventional video search system may not provide a user with a satisfactory search experience for several reasons. For example, a conventional search system may return irrelevant search results by searching for videos using textual metadata that is not representative of the content of the video. In some instances, by inputting "Laplace" as a search query, a user may intend to search for video content in which the word "Laplace" is spoken, such as a video clip including a lecture on the Laplace transform. In such an example, search results generated based on textual metadata of videos, such as videos entitled "Laplace," may be irrelevant to the search query inputted by the user.

As another example, a conventional video search system may return the same results responsive to a particular search query when a user resubmits the search query. That is, the user may have to continuously modify the search query and resubmit the modified search query to the video search system to view different search results. This can be a time consuming and frustrating procedure for the user, especially when the user is unaware of the search terms that may lead to the video content that the user is looking for.

Accordingly, it is desirable to provide new mechanisms for searching for video content.

SUMMARY

Methods, systems, and media for searching for video content are provided. In accordance with some embodiments of the disclosed subject matter, a system for searching for video content is provided, the system comprising: at least one hardware processor that is configured to: receive a search query including at least one search term; identify a plurality of video segments that match the search query, wherein each of the plurality of video segments is associated with a transcript that includes the search term; select a first set of video segments from the plurality of video segments; generate a first composite video by combining the first set of video segments; and cause the first composite video to be presented.

In accordance with some embodiments of the disclosed subject matter, a method for searching for video content is provided, the method comprising: receiving a search query including at least one search term; identifying a plurality of video segments that match the search query, wherein each of the plurality of video segments is associated with a transcript that includes the search term; selecting a first set of video segments from the plurality of video segments; generating, using a hardware processor, a first composite video by combining the first set of video segments; and causing the first composite video to be presented.

In accordance with some embodiments of the disclosed subject matter, a non-transitory computer-readable medium containing computer-executable instructions that, when executed by a processor, cause the process to perform a method for searching for video content is provided, the method comprising: receiving a search query including at least one search term; identifying a plurality of video segments that match the search query, wherein each of the plurality of video segments is associated with a transcript that includes the search term; selecting a first set of video segments from the plurality of video segments; generating a first composite video by combining the first set of video segments; and causing the first composite video to be presented.

In accordance with some embodiments of the disclosed subject matter, a system for searching for video content is provided, the system comprising: means for receiving a search query including at least one search term; means for identifying a plurality of video segments that match the search query, wherein each of the plurality of video segments is associated with a transcript that includes the search term; means for selecting a first set of video segments from the plurality of video segments; means for generating a first composite video by combining the first set of video segments; and means for causing the first composite video to be presented.

In some embodiments, the system further comprises: means for receiving a request to generate an updated composite video; means for selecting a second set of video segments from the plurality of video segments; means for generating a second composite video by combining the second set of video segments; and means for causing the second composite video to be presented on the display.

In some embodiments, the system further comprises: means for associating the search query with a plurality of keywords based at least in part on the search term; means for identifying a portion of a transcript that includes at least one of the plurality of keywords; means for identifying a first time stamp that is associated with the portion of the transcript; means for identifying a video associated with the transcript; and means for identifying a segment of the video based at least in part on the first time stamp.

In some embodiments, the system further comprises: means for identifying a second time stamp that is associated with the portion of the transcript; and means for identifying the segment of the video based at least in part on the second time stamp, wherein the first time stamp corresponds to a start time of the segment of the video and wherein the second time stamp corresponds to an end time of the segment of the video.

In some embodiments, the segment of the video is one of the plurality of video segments that match the search query.

In some embodiments, the system further comprises: means for determining a matching score for each of the plurality of video segments; and means for selecting the first set of video segments from the plurality of video segments based at least in part on a plurality of matching scores associated with the plurality of video segments.

In some embodiments, the system further comprises means for selecting the first set of video segments based on a pseudorandom function.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
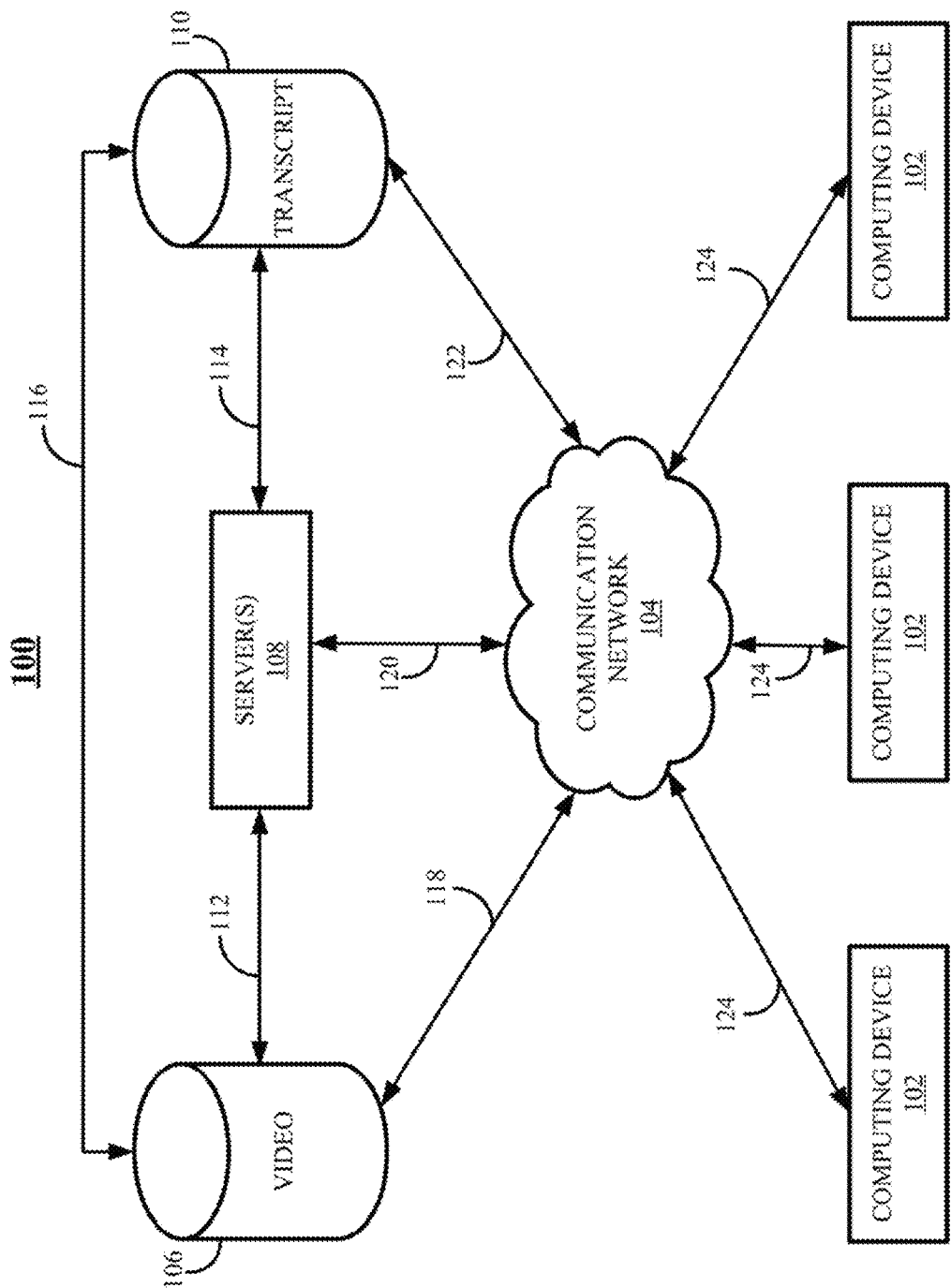
FIG. 1 shows a generalized schematic diagram of an illustrative system for searching for video content in accordance with some embodiments of the disclosed subject matter.

In some embodiments, mechanisms (which can include methods, systems, and media) for searching for video content are provided.

These mechanisms can be used in a variety of applications. For example, the mechanisms can be used to search for video content responsive to a textual search query based on audio content associated with the video content. In a more particular example, in response to receiving a search query "vector image," the mechanisms can access a database and identify a set of video segments in which the phrase "vector image(s)" is mentioned. In another more particular example, the mechanisms can receive a user selection of one or more videos (e.g., a video including a lecture on graphics) and identify portions of the videos in which the search query or keywords associated with the search query are mentioned (e.g., "vector image").

As another example, these mechanisms can be used to present search results responsive to a search query for video content in the form of a video including multiple video segments that match the search query. In a more particular example, upon identifying a set of video segments that match a search query (e.g., a set of video segments in which the phrase "vector image(s)" is mentioned), the mechanisms can combine the set of video segments into a single video and, in some embodiments, can automatically playback the video as a search result that is responsive to the search query.

In some embodiments, these mechanisms can receive a search query for video content. For example, the mechanisms can launch a client application on a computing device, such as a mobile phone, a laptop computer, a tablet computer, a wearable computer, a television, etc. The mechanisms can then present multiple user interfaces that allow a user to input a search query using a keypad, a user input device (e.g., a microphone, a keyboard, a remote control, a directional pad, etc.), and/or any other suitable input mechanism.

In some embodiments, the mechanisms can associate a search query with one or more keywords upon receiving the search query. For example, the mechanisms can analyze the search query and parse the search query into multiple search terms. The mechanisms can then identify each of the search terms as a keyword associated with the search query. Additionally or alternatively, the mechanisms can identify a synonym and/or acronym of a search term, and/or any other suitable terms relating to one or more of the search terms as keywords associated with the search query.

In some embodiments, the mechanisms can search for video segments that match the search query. In some embodiments, a video segment can be regarded as a match to a search query and thus a matching video segment when a transcript corresponding to the video segment contains one or more keywords associated with the search query. In some embodiments, the mechanisms can access a database storing transcripts associated with video content and can identify portions of the transcripts that contain one or more keywords associated with the search query. In some embodiments, upon locating a portion of a transcript that matches the search query, the mechanisms can identify one or more time stamps associated with that portion of the transcript, such as a time stamp that indicates the portion of the transcript that a particular word is spoken in a video, a time stamp that indicates the start or the end of the presentation of a video segment corresponding to the portion of the transcript, etc. The mechanisms can then identify a matching video segment based on the time stamp(s) associated with the portion of the transcript. For example, the mechanisms can identify a video corresponding to the transcript that matches the search query based on an index system that maps the transcripts to the videos. The mechanisms can then identify a segment of the video that is defined by the time stamp(s) as a matching video segment.

In some embodiments, the mechanisms can select a subset of matching video segments upon identifying a set of video segments that match the search query. For example, the mechanisms can select the subset of matching video segments based on relevance, popularity, recency, ordering of the search terms within the search query, and/or any other suitable criterion or criteria. As another example, the mechanisms can allow a user to select a subset of matching video segments by presenting one or more suitable user interfaces using the client application.

In some embodiments, the mechanisms can generate a composite video by combining the subset of matching video segments. For example, the mechanisms can combine a first matching video segment and a second matching video segment by concatenating the last frame of the first matching video segment and the first frame of the second matching video segment, adding a blank frame between the last frame of the first matching video segment and the first frame of the second matching video segment, and/or in any other suitable manner.

In some embodiments, the mechanisms can present the composite video to the user as a search result responsive to the search query. For example, the mechanisms can cause the composite video to be played automatically upon generating the composite video. As another example, the mechanisms can present an image or a snippet representative of the composite video and/or any other suitable information about the composite video. The mechanisms can then cause the composite video to be presented in response to receiving a request to playback the composite video (e.g., a user selection of a "play" button using a user input device).

In some embodiments, the mechanisms can provide a user with updated search results responsive to a search query without receiving the same search query from the user. For example, in response to receiving a user request for an updated search result, the mechanisms can select an updated set of matching video segments and generate an updated composite video by combining the updated set of matching video segments.

These and other features for searching for video content are described herein in connection with FIGS. 1-13.

Turning to FIG. 1, an illustrative example 100 of a generalized schematic diagram of a system for searching for video content is shown in accordance with some embodiments of the disclosed subject matter. As illustrated, system 100 can include one or more computing devices 102, a communication network 104, a video database 106, one or more server(s) 108, a transcript database 110, communication links 112, 114, 116, 118, 120, 122, and 124, and/or any other suitable components.

Computing device 102 can be or include any suitable device that can receive, process, and/or transmit search queries, receive and present search results responsive to a search query (e.g., a composite video), communicate with server(s) 108, and/or perform any other suitable functions. For example, computing device 102 can be implemented as a mobile phone, a tablet computer, a wearable computer, a television device, a set-top box, a digital media receiver, a game console, a personal computer, a laptop computer, a personal data assistant (PDA), a home entertainment system, any other suitable computing device, or any suitable combination thereof.

Communication network 104 can be any suitable computer network or combination of such networks including the Internet, an intranet, a wide-area network (WAN), a local-area network (LAN), a wireless network, a Wi-Fi network, a WiMax network, a digital subscriber line (DSL) network, a frame relay network, an asynchronous transfer mode (ATM) network, a virtual private network (VPN), etc.

Video database 106 can include any suitable device that can store videos, metadata associated with each of the videos (e.g., a description of a video, a title of a video, a tag associated with a video, an author of a video, and/or any other suitable metadata associated with a video), and/or any other suitable video data.

Server(s) 108 can include one or more suitable devices that can receive search queries, process search queries, identify video content based on search queries, generate composite videos based on search queries, and/or perform any other suitable functions.

Transcript database 110 can be and/or include any suitable device that can store transcripts associated with video content (e.g., videos stored in video database 106 and/or any other suitable storage device), metadata associated with the video content, and/or any other suitable information.

In some embodiments, the transcripts can be obtained in any suitable manner. For example, a transcript associated with a given video can be obtained based on captioning content associated with the video (e.g., closed captioning content associated with a television program, a movie, etc.). As another example, a transcript associated with a video can be obtained by transcribing audio content associated with the video. In a more particular example, the transcript can be generated by extracting audio content from the video, processing the audio content (e.g., by segmenting, transcoding, filtering, etc. the audio content), converting the processed audio content to text using a suitable speech recognition technique, and generating a transcript based on the text.

In some embodiments, a transcript can be aligned to a video and/or audio content associated with the video in a suitable manner. For example, each word in the transcript can be associated with a time stamp that indicates the time that the word is spoken in the video. As another example, a portion of the transcript can be associated with one or more time stamps of a video segment in the video that corresponds to the portion of the transcript, such as a time stamp that indicates the start or the end of the presentation of the video segment, and/or any other suitable time stamps associated with the video segment. In some embodiments, the video segment can include one or more video frames that correspond to one or more speech utterances (phrases, sentences, etc.), audio scenes, video scenes, and/or any other suitable portions of the video.

In some embodiments, the videos stored in video database 106 can be indexed by text and mapped to their associated transcripts. For example, an inverted index and/or any other suitable data structure can be used to store a mapping from a word (or a phrase, sentence, etc.) to a video that is associated with a transcript containing the word, one or more time stamps associated with the word, one or more video identifiers that can identify the video, and/or any other suitable data.

In a more particular example, an internal video database can include one or more videos and metadata for each video, such as the title, the description entered by the video owner, and a number of formats and locations where the video is available. In this example, the internal video database can be periodically scanned for changes (e.g., additions or deletions). A workflow manager associated with the internal video database can coordinate the actions of a waveform transcoder and a transcription client, where the waveform transcoder extracts the audio signal from one or more videos and downsamples them. The workflow manager can maintain a queue of transcoded videos that can be processed by the transcription client. The transcription client can submit the audio signals to an automatic speech recognition server that segments the audio, discards music and noise, and performs the transcription using a multi-pass decoding strategy. This can provide a time-aligned transcript and confidence scores associated with each word in the transcript. This information can be stored in an utterance database and serves as the basis for the information retrieval index. The index allows search as well as navigation within videos in the user interface.

In some embodiments, server(s) 108 can be connected to video database 106 and transcript database 110 video through communication links 112 and 114, respectively. Video database 106 and transcript database 110 can be connected through communication link 116 in some embodiments. Video database 106, server(s) 108, transcript database 110, and computing device(s) 102 can be connected to communication network 104 through communication links 118, 120, 122, and 124, respectively. Communication links 112, 114, 116, 118, 120, 122, and 124 can be and/or include any communication links suitable for communicating data among video database 106, server(s) 108, transcript database 110, and computing device(s) 102, such as network links, dial-up links, wireless links, hard-wired links, any other suitable communication links, or any suitable combination of such links. Computing devices 102 can enable use of the techniques described herein that can allow the features of the mechanisms to be used.

In some embodiments, each of video database 106, server(s) 108, transcript database 110, and communication network 104 can be implemented as a stand-alone device or integrated with other components of system 100. For example, storage video database 110 and transcript database 110 can be implemented as one system in some embodiments. As another example, server(s) 108 and one or more of video database 106 and transcript database 110 can be implemented as one system in some embodiments.

Figure 2:
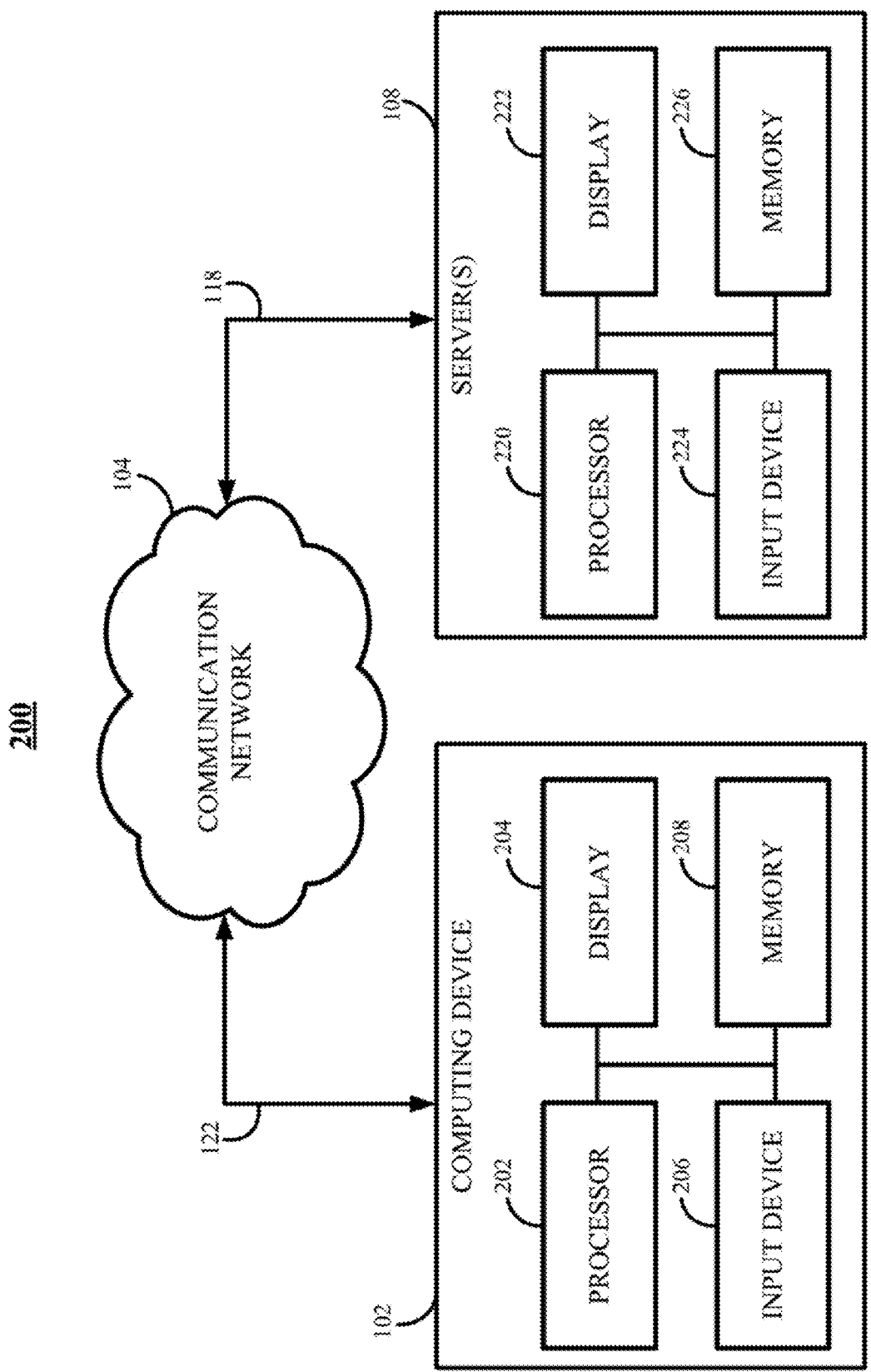
FIG. 2 shows a detailed example of a server and one of the computing devices of FIG. 1 that can be used in accordance with some embodiments of the disclosed subject matter.

FIG. 2 illustrates an example 200 of hardware that can be used to implement one or more of server(s) 108 and one of computing devices 102 depicted in FIG. 1 in accordance with some embodiments of the disclosed subject matter. Referring to FIG. 2, computing device 102 can include a hardware processor 202, a display 204, an input device 206, and memory 208, which can be interconnected. In some embodiments, memory 208 can include a storage device (such as a non-transitive computer-readable medium) for storing a computer program for controlling hardware processor 202.

Hardware processor 202 can use the computer program to present on display 204 content and/or an interface that allows a user to interact with the client application and to send and receive data through communication link 122. It should also be noted that data received through communication link 122 or any other communication links can be received from any suitable source. In some embodiments, hardware processor 202 can send and receive data through communication link 122 or any other communication links using, for example, a transmitter, receiver, transmitter/receiver, transceiver, or any other suitable communication device. Input device 206 can be a computer keyboard, a mouse, a trackball, a keypad, a remote control, a gesture recognition system, any other suitable input device, or any suitable combination thereof. Additionally or alternatively, input device 206 can include a touch screen display 204 that can receive input (e.g. using a finger, a stylus, or the like).

Server 108 can include a hardware processor 220, a display 222, an input device 224, and memory 226, which can be interconnected. In some embodiments, memory 226 can include a storage device for storing data received through communication link 118 or through other links, and processor 220 can receive commands and values transmitted by one or more users of, for example, computing device 102. The storage device can further include a server program for controlling hardware processor 220.

The mechanisms described herein for searching for video content can be implemented in computing devices 102 and/or server 108 as software, firmware, hardware, or any suitable combination thereof.

In some embodiments, server 108 can be implemented as one server or can be distributed as any suitable number of servers. For example, multiple servers 108 can be implemented in various locations to increase reliability, function of the application, and/or the speed at which the server can communicate with computing devices 102.

In some embodiments, the client application can include an application program interface (not shown), and/or can be resident in memory 208 of computing device 102 and/or memory 226 of server 108. Additionally or alternatively, a graphical user interface ("GUI") can be distributed to computing device 102, which can allow a user to interact with the client application resident at, for example, server 108.

In some embodiments, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by computing device 150 and/or server 220 that is executing the application(s) (e.g., a program written in a programming language, such as, Java, C, Objective-C, C++, C#, Javascript, Visual Basic, HTML, XML, ColdFusion, any other suitable approaches, or any suitable combination thereof).

In some embodiments, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments, a client application that can facilitate video search based on audio content is provided. In some embodiments, the client application can be a mobile application, a Web browser, a social networking application, a video playback application, and/or any other suitable application that can receive search queries, process search queries, receive video content responsive to search queries, present the video content in the form of one or more composite videos, and/or perform any other suitable function. In some embodiments, the client application can be loaded on a computing device, such as a computing device 102 as described above in connection with FIGS. 1 and 2.

In some embodiments, once loaded on the computing device, the client application can present multiple user interfaces as shown in FIGS. 3-11 to allow a user to input a search query, view search results responsive to the search query, and/or share the search results with other users.

Figure 3:
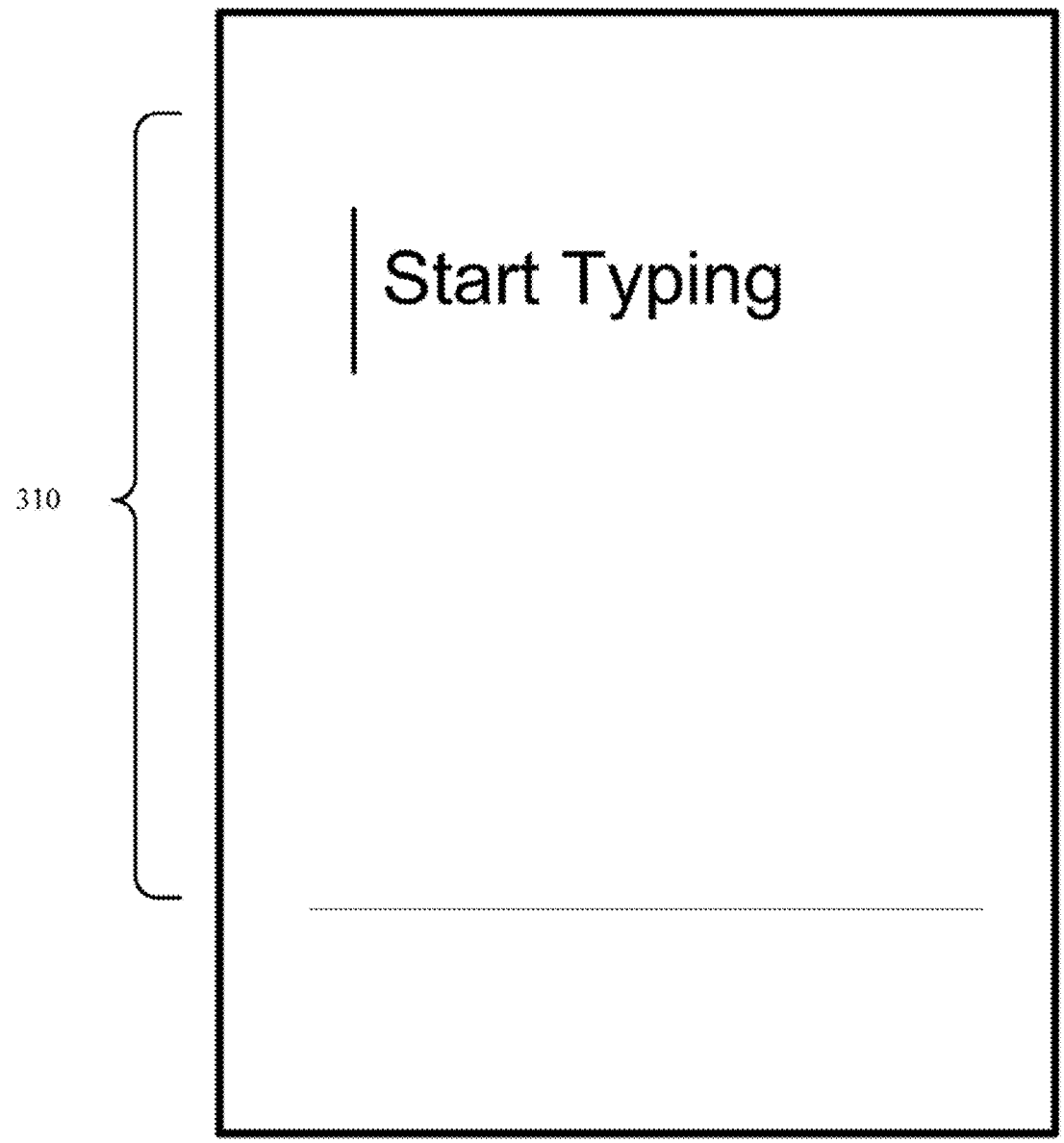
FIG. 3 shows an illustrative example of a user interface for loading a client application in accordance with some embodiments of the disclosed subject matter.

Turning to FIG. 3, the client application executing on the computing device (e.g., computing device 102 of FIG. 1) can cause a user interface 300 to be presented to prompt a user to enter a search query for video content. As shown, interface 300 can include an input field 310 in which a user can input a search query using a suitable user input device, such as an input device 206 of FIG. 2.

Figure 4:
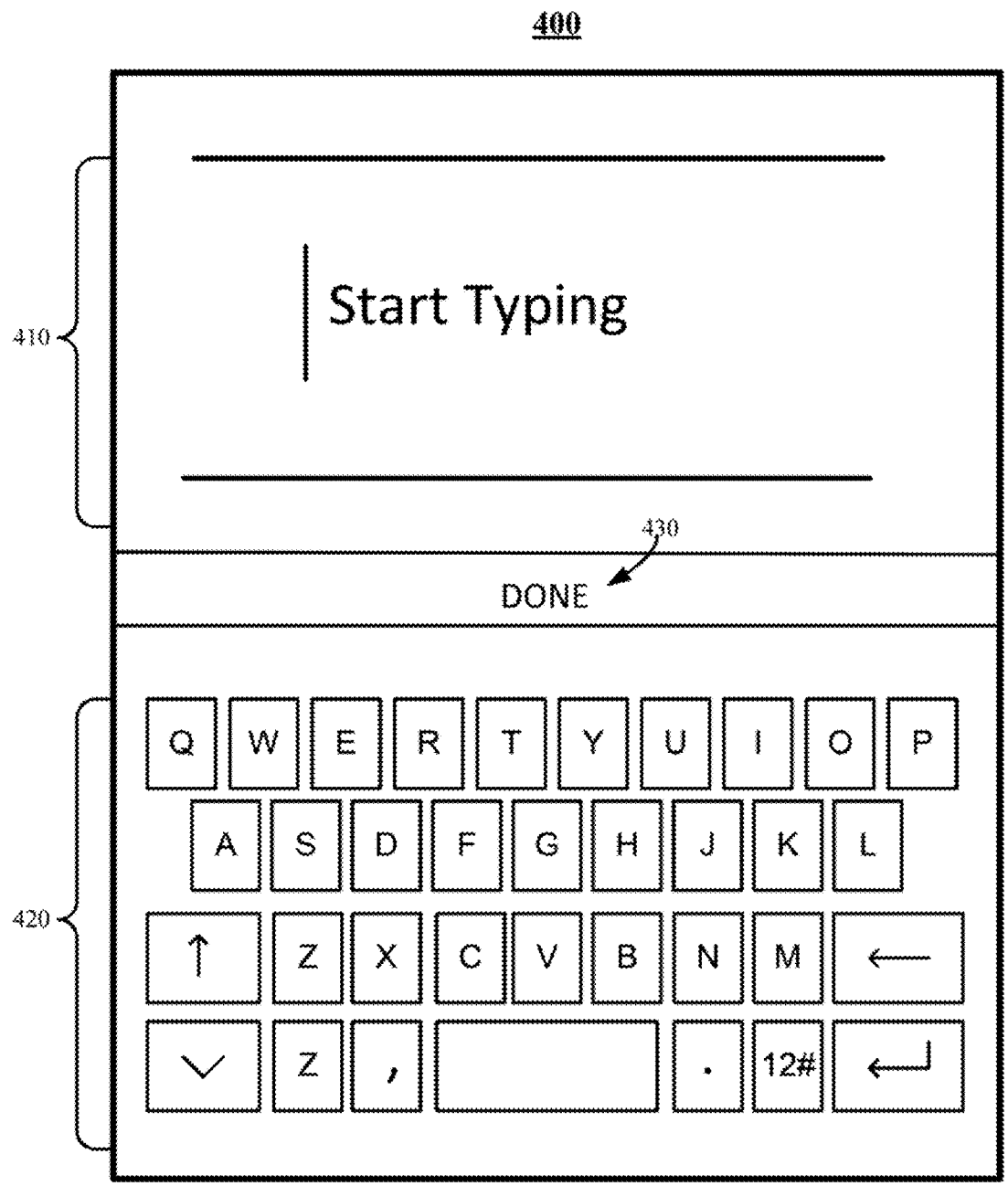
FIG. 4 shows an illustrative example of a user interface for prompting a user to input a search query for video content in accordance with some embodiments of the disclosed subject matter.
Figure 5:
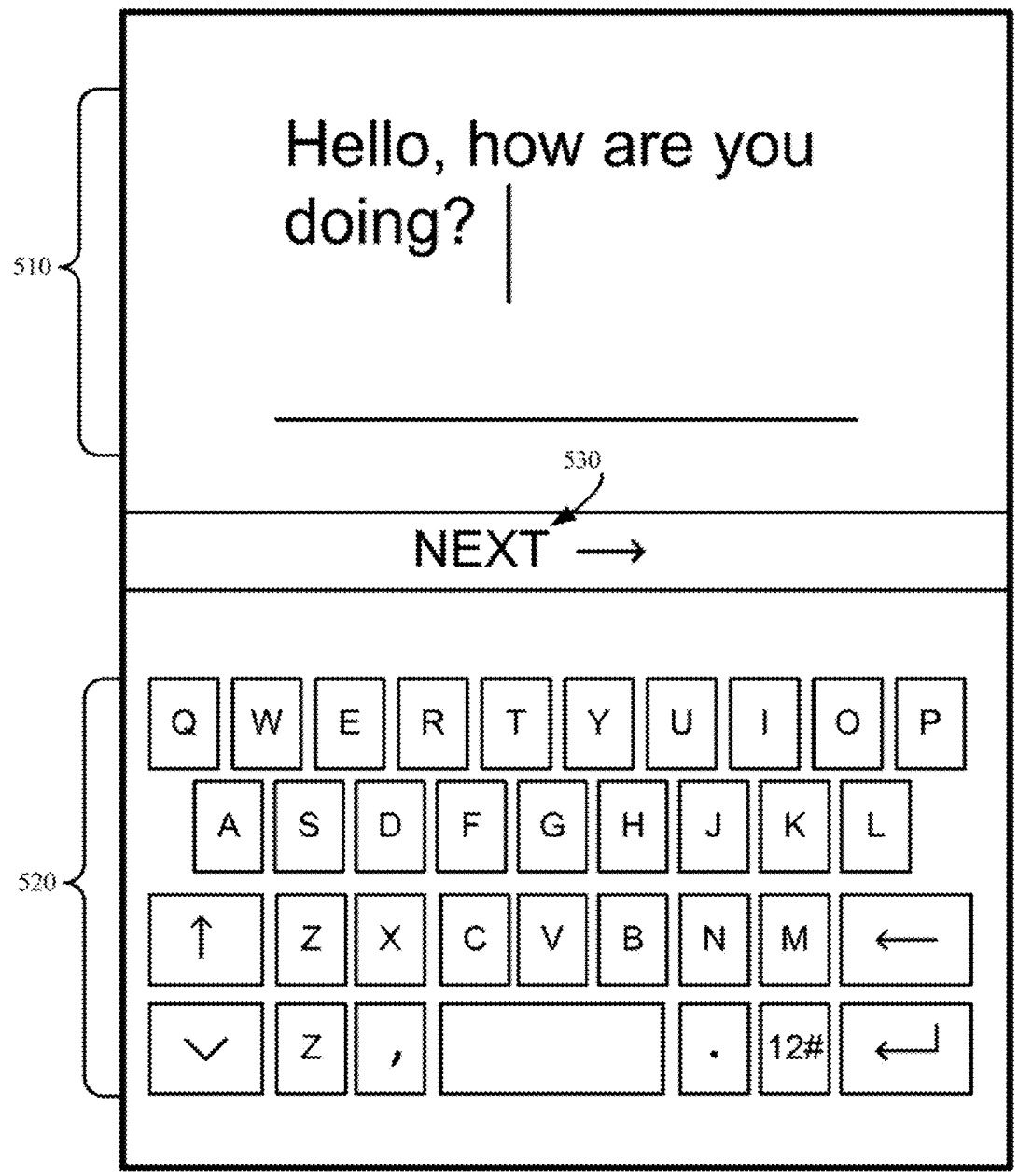
FIG. 5 shows an illustrative example of a user interface for receiving a search query for video content in accordance with some embodiments of the disclosed subject matter.

In some embodiments, in response to receiving a user input indicative of a user's desire to input a search query (e.g., a user touching or clicking input field 310 of FIG. 3, a user hovering a pointer over field 310, etc.), the client application can cause a user interface 400 of FIG. 4 to be presented. As shown, interface 400 can include an input field 410, a keypad 420, and/or any other suitable element. In some embodiments, the client application can allow a user to input a search query by selecting one or more keys of keypad 420 using a stylus, the user's fingers, gestures, a remote control, etc. For example, as shown in FIG. 5, a search query "hello, how are you doing?" can be received in response to a user entering the search query in input field 410 using keypad 420. In some embodiments, the client application can receive a voice command issued by a user through an audio input device, such as a microphone. In some embodiments, the client application can analyze the search query (e.g., by converting the voice command to text using a suitable speech recognition technique) and parse the search query into one or more search terms (e.g., words, phrases, etc.). Any suitable technique can be used for inputting a search query, such as by copying a portion of text from a document into input field 410, by importing a portion of text into input field 410, etc.

In some embodiments, in response to receiving a search query for video content (e.g., by inputting the search query in input field 510 and selecting a confirmation button 530 of FIG. 5), the client application can transmit the search query and/or any suitable information relating to the search query to a server, such as server 108 of FIG. 1, that can search for video content based on the search query.

Figure 6:
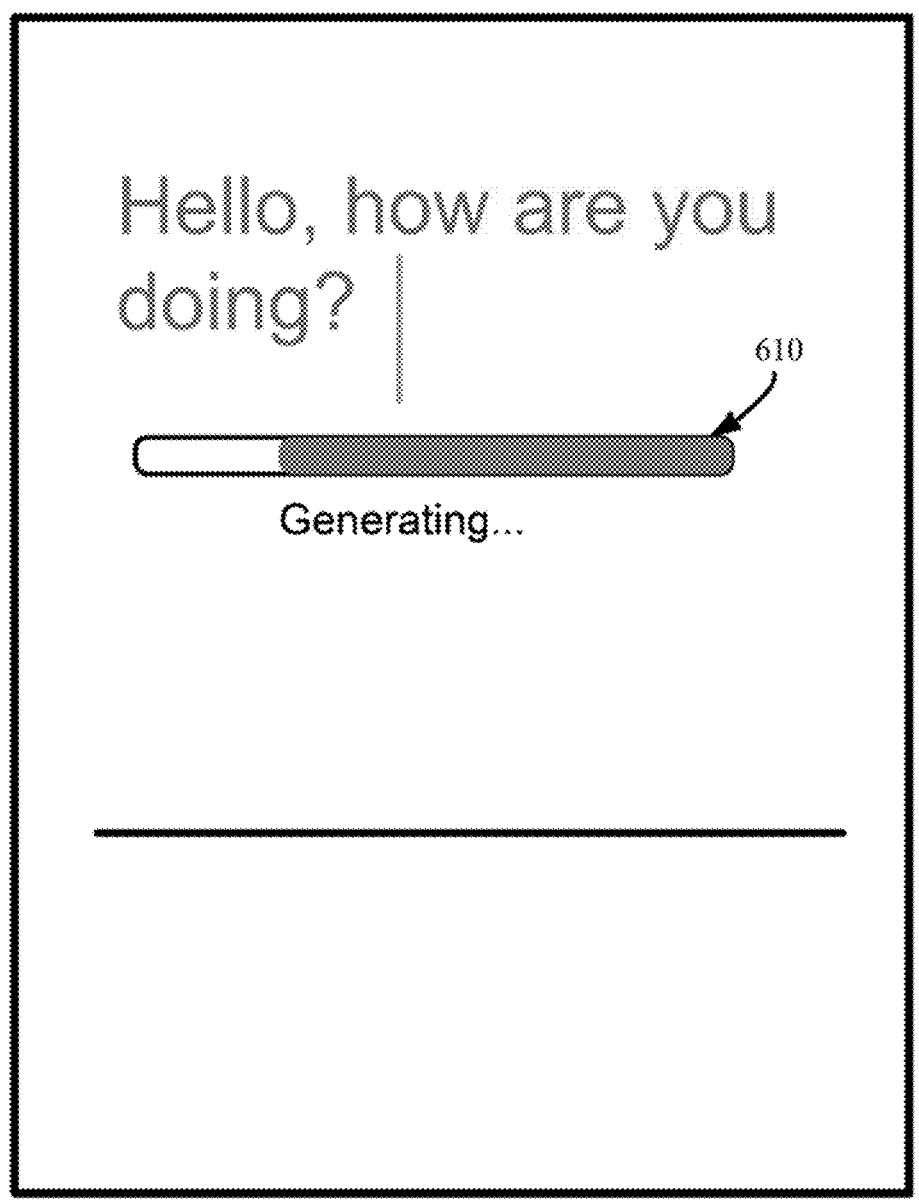
FIG. 6 shows an illustrative example of a user interface for generating a search result responsive to a search query in accordance with some embodiments of the disclosed subject matter.

In some embodiments, while waiting for search results to be transmitted from the server, the client application can inform the user that a search for video content is being performed in response to the search query inputted by the user. For example, the client application can cause a user interface 600 as shown in FIG. 6 to be presented. As illustrated, interface 600 can include an indicator 610 indicating that the search query is being processed and search results are being generated in response to the search query inputted by the user.

In some embodiments, a search result responsive to a search query can be presented in the form of a composite video that is produced by combining multiple video segments that match the search query. For example, a composite video responsive to search query "hello, how are you doing" can include multiple video segments in which "hello, how are you doing," "hello," and/or "how are you" are spoken. In some embodiments, the composite video can be generated by a server and transmitted to the client application. Alternatively or additionally, the composite video can be generated by the client application in some embodiments. For example, the client application can retrieve the videos or video segments and locally stitches them together to form the composite video.

Figure 7:
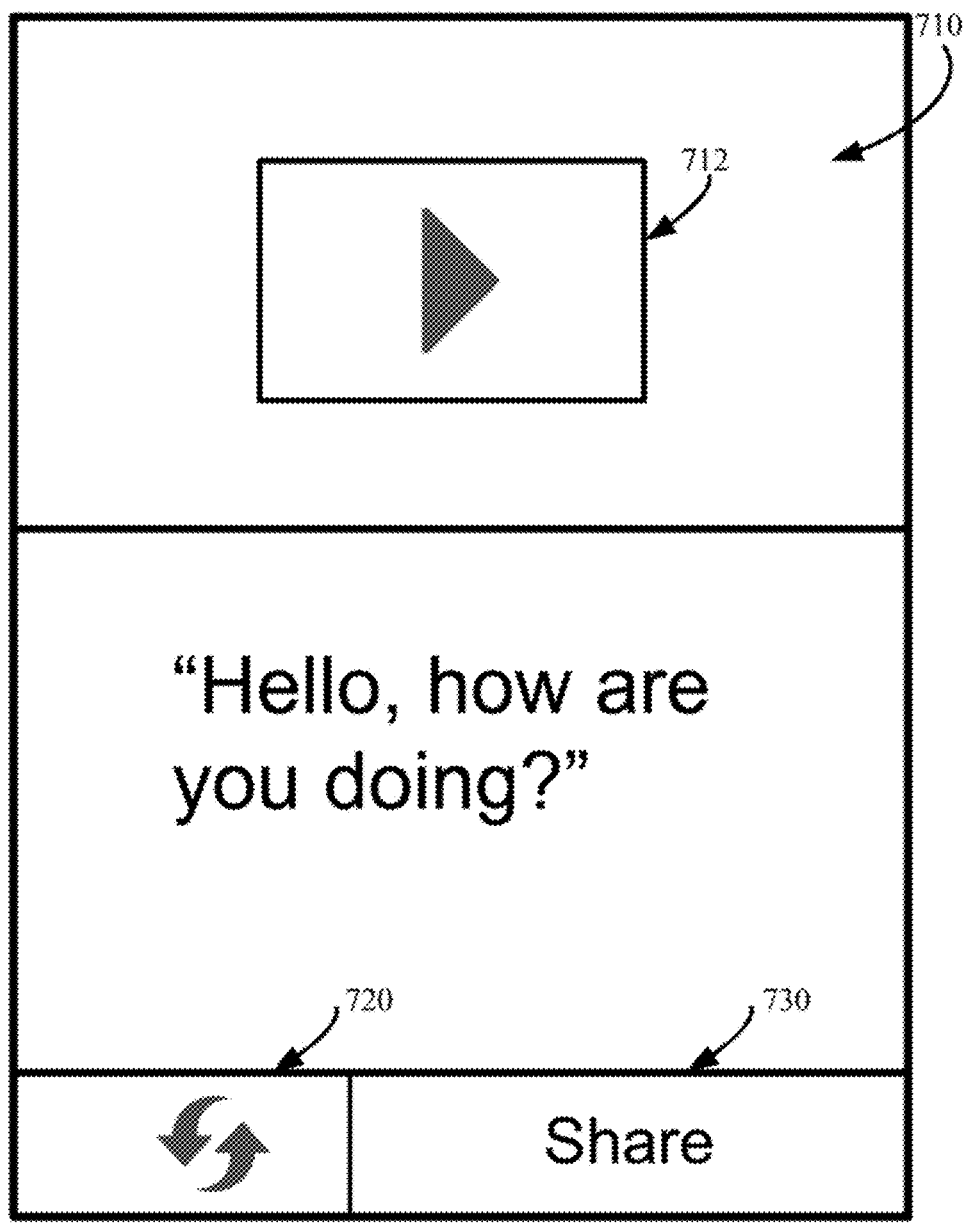
FIG. 7 shows an illustrative example of a user interface for presenting a search result responsive to a search query in accordance with some embodiments of the disclosed subject matter.

In some embodiments, the client application can cause the composite video to be presented on a display (e.g., a display 204 as described above in connection with FIG. 2). For example, the client application can automatically begin playing back the video on the display as a search result responsive to the search query. In a more particular example, as shown in FIG. 7, the composite video can be presented in a playback area 710 of a user interface 700 in some embodiments.

As another example, the client application can cause the composite video to be presented in response to receiving a user request to playback the composite video. In a more particular example, the client application can present the composite video in playback area 710 in response to receiving a user selection of a "play" button 712 of interface 700 and/or any other suitable user input indicative of a request to playback the composite video.

In some embodiments, the client application can provide a user with updated search results without receiving the same search query from the user. For example, in response to receiving a user input indicative of a request to update a search result responsive to a search query (e.g., a user selection of "refresh" button 720 of FIG. 7), the client application can cause an updated search result to be generated for the search query that has been inputted by the user (e.g., "hello, how are you doing"). More particularly, for example, the client application can transmit a request for an updated search result to the server.

Figure 8:
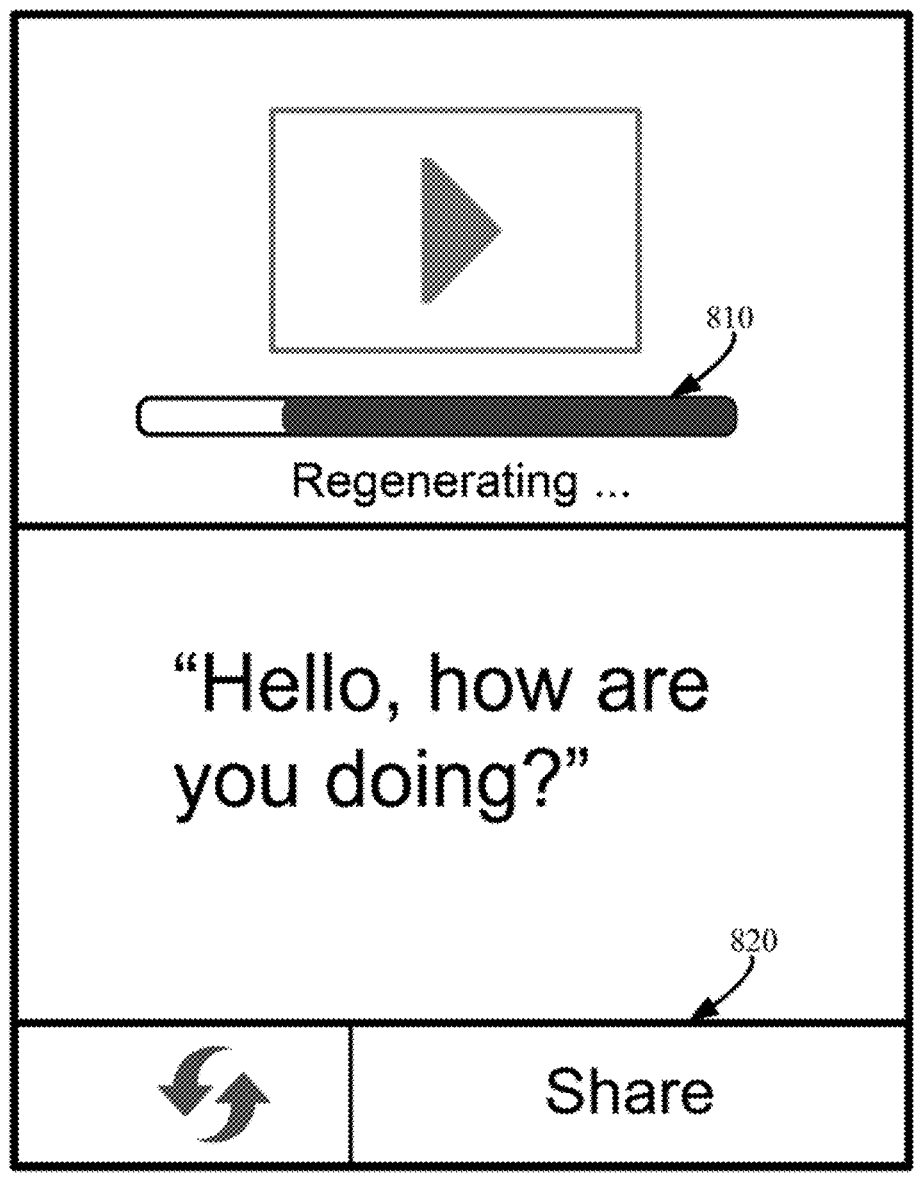
FIG. 8 shows an illustrative example of a user interface for updating a search result responsive to a search query in accordance with some embodiments of the disclosed subject matter.

In some embodiments, while waiting for an updated search result (e.g., an updated composite video) to be transmitted from the server, the client application can inform the user that an updated search result is being generated based on the search query inputted by the user. For example, the client application can cause a user interface 800 as shown in FIG. 8 to be presented. As illustrated, interface 800 can include information about the search query inputted by the user and an indicator 810 indicating that an updated search result is being generated based on the search query.

In some embodiments, an updated search result in response to the search query can be presented in the form of an updated composite video that is produced by combining multiple video segments that match the search query. In some embodiments, the video segments that are used to produce the updated composite video may or may not contain one or more of the video segments that are used to produce the composite video that has been presented to the user. In some embodiments, the updated composite video can be generated by a server (e.g., server 108 of FIG. 1) and transmitted to the client application. Alternatively or additionally, client application can receive the videos or video segments and locally combine them to form the updated composite video.

In some embodiments, the client application can automatically begin playing back the updated composite video on the display (e.g., in playback area 710 of user interface 700 as shown in FIG. 7). Alternatively, the client application can cause the updated composite video to be presented in response to receiving a user request to playback the updated composite video (e.g., a user selection of a "play" button 712 of interface 700).

In some embodiments, the client application can prompt a user to navigate through multiple composite videos responsive to a search query and select a composite video for playback. For example, the client application can present information relating to the composite videos (e.g., using one or more suitable user interfaces). In some embodiments, information relating to the composite videos can be presented using any suitable content items, such as images, animations, text snippets, links (e.g., URLs) to the composite videos, etc. In some embodiments, the client application can allow a user to scroll through content items corresponding to the composite videos (e.g., text snippets, URLs, thumbnail images, animations, etc.) and can then playback a particular composite video in response to receiving a user selection of a content item corresponding to the composite video.

Figure 9:
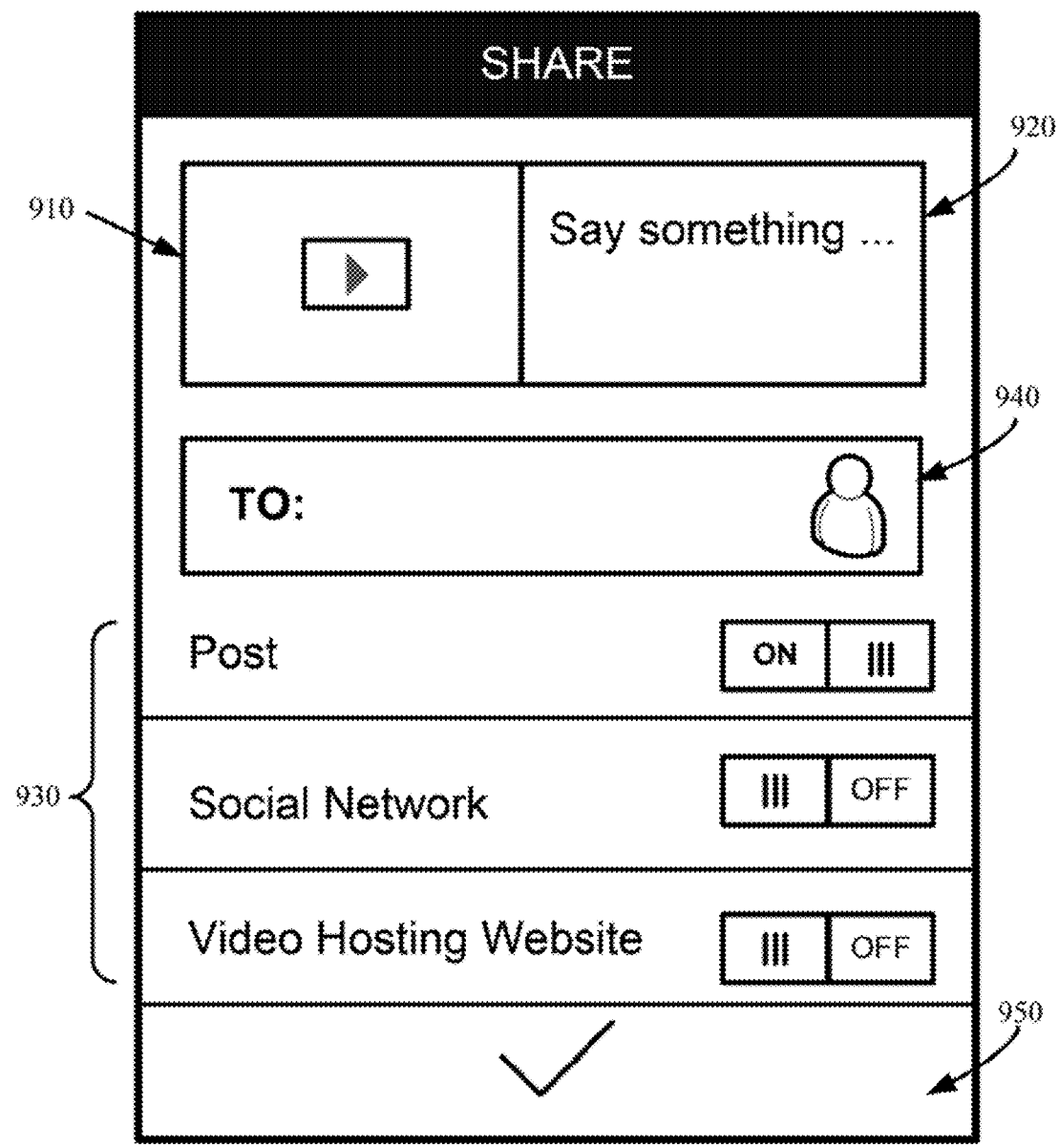
FIG. 9 shows an illustrative example of a user interface for sharing a search result responsive to a search query in accordance with some embodiments of the disclosed subject matter.
Figure 10:
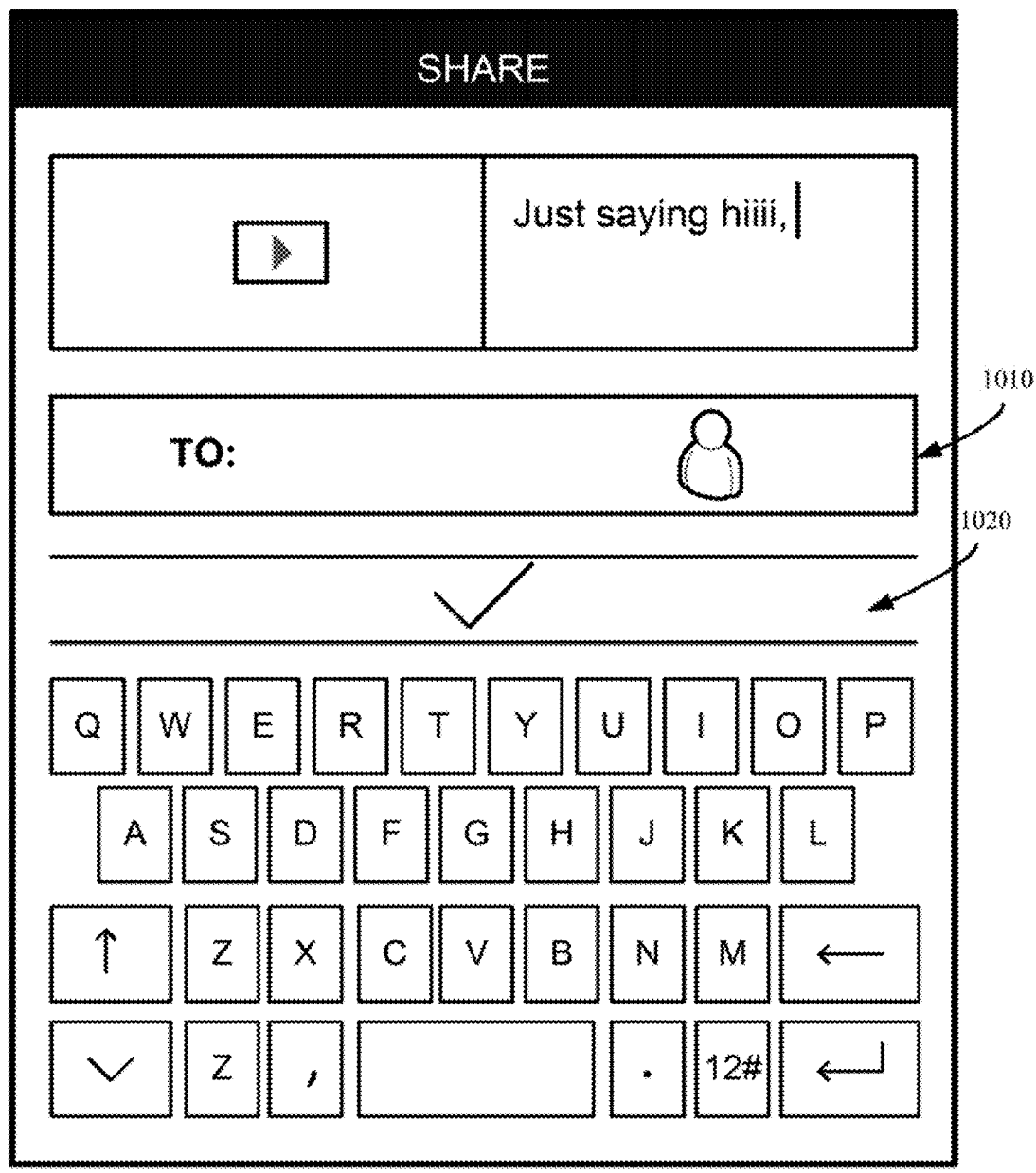
FIG. 10 shows an illustrative example of a user interface for sharing a search result responsive to a search query with social contacts of a user in accordance with some embodiments of the disclosed subject matter.
Figure 11:
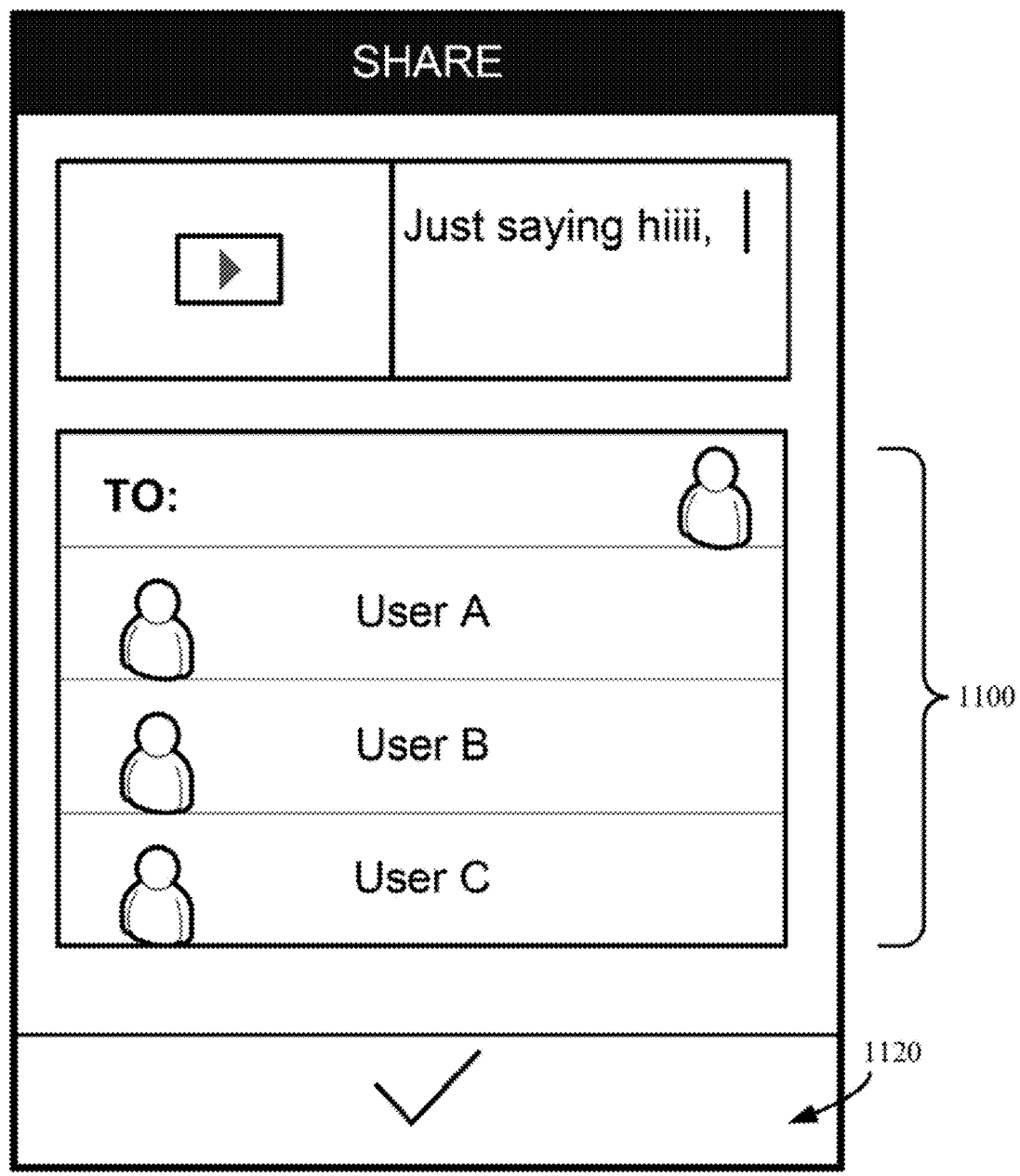
FIG. 11 shows an illustrative example of a user interface for sharing a search result responsive to a search query with a group of users in accordance with some embodiments of the disclosed subject matter.

In some embodiments, the client application can allow a user to share a search result (e.g., a composite video) and/or any other suitable information relating to the search result with other users using suitable user interfaces, such as user interfaces 900, 1000, and 1100 as shown in FIGS. 9, 10, and 11, respectively.

For example, the application can allow a user to publish a search result via a social networking service, a video hosting service, and/or any other suitable platform using one or more suitable user interfaces. In a more particular example, in response to receiving a request to share a search result (e.g., a composite video and/or any suitable information relating to the composite video) with other users (e.g., a user selection of a share button 730 or 820), the client application can cause a user interface 900 as shown in FIG. 9 to be presented. As illustrated, interface 900 can include an image 910, a text field 920, one or more sharing options 930, a contact entry field 940, and/or any other suitable components. In some embodiments, image 910 can be a thumbnail, a snippet, and/or any other suitable representation of a composite video. In some embodiments, the client application can allow a user to input text, voice messages, and/or any other suitable content that can be shared in association with the composite video using input field 920. In some embodiments, a user can share a composite video via a service provided by the client application, a social networking service, a video hosting service, an email service, and/or any other suitable a platform by selecting a sharing option corresponding 930 to the platform and a confirmation button 950.

As another example, the client application can allow a user to identify one or more other users and share a search result with the identified users. In a more particular example, the client application can allow a user to identify one or more others users that are connected to the user via a suitable platform (e.g., a social networking service, an email service, a video hosting service, etc.) by inputting contact information relating to the other users (e.g., using a contact entry field 940 of FIG. 9 or a contact entry field 1010 of FIG. 1000), selecting one or more users from a list of users 1100 of FIG. 11, and/or any using any other suitable mechanism. In some embodiments, the client application can send the search result (e.g., a composite video), messages entered by the user, and/or any other suitable information to the identified users in response to receiving a user confirmation (e.g., a user selection of one or more of confirmation buttons 950, 1020, and/or 1120 as shown in FIGS. 9, 10, and 11, respectively).

Figure 12:
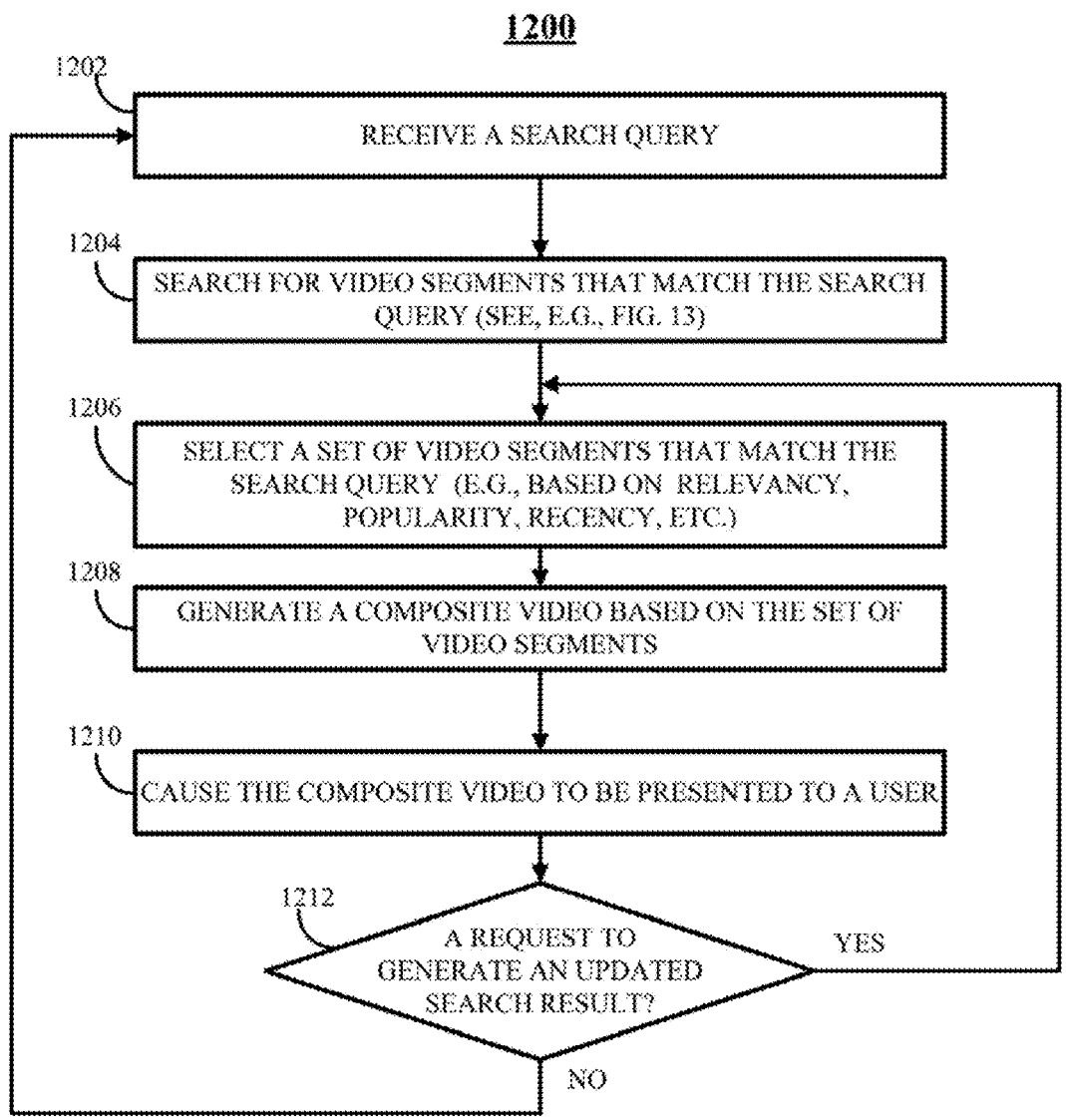
FIG. 12 shows an illustrative example of a process for searching for video content in accordance with the embodiments of the disclosed subject matter.

Turning to FIG. 12, an illustrative example 1200 of a process for searching for video content is shown in accordance with some embodiments of the disclosed subject matter. In some embodiments, process 1200 can be implemented by a hardware processor of one or more suitable components of system 100, such as a server 108, a computing device 102, etc.

As illustrated, process 1200 can begin by receiving a search query at 1202. The search query can include any suitable number of words, phrases, sentences, numbers, and/or any other suitable search terms. In some embodiments, the search query can be composed in one or more different languages.

In some embodiments, the search query can be received in any suitable manner. For example, the search query can be received through one or more request messages (e.g., Hyper-Text Transfer Protocol (HTTP) requests) transmitted from a computing device running the client application described above in connection with FIGS. 3-11. In some embodiments, the search query can correspond to any suitable user input. For example, the search query can correspond to one or more search terms inputted by a user using a suitable user input device, such as a keyboard, a mouse, a remote control, a gesture recognition system, etc. In a more particular example, as described above in connection with FIGS. 3-5, the search query can be received using multiple user interfaces presented by a client application. As another example, the search query can be received via a voice command issued by a user through an audio input device (e.g., a microphone). In a more particular example, a voice command of "hello, how are you doing" can be received and converted into text using a suitable speech recognition technique.

In some embodiments, the received search query can be processed using a suitable natural language processing technique and/or any other suitable technique. For example, the search query can be parsed into multiple search terms using a suitable natural language processing algorithm. Additionally, the search query can be associated with a mood (e.g., "happy," "sad," "neutral," etc.) based on the search terms in some embodiments.

Next, at 1204, process 1200 can search for video segments that match the search query. For example, process 1200 can access a database storing transcripts associated with video content and identify transcripts that match the search query. Process 1200 can then identify video segments that match the search query based on the identified transcripts. In a more particular example, as described hereinbelow in connection with FIG. 13, a video segment that matches a search query can be identified by searching for a portion of a transcript that contains one or more keywords associated with the search query, identifying one or more time stamps associated with the portion of the transcript, and identifying a segment of a video that corresponds to the portion of the transcript based on the timestamps.

In some embodiments, process 1200 can receive a user selection of one or more videos, such as one or more videos published on a channel of a video sharing service, videos stored in a storage device, etc. Process 1200 can then search for video segments that match the search query within the selected videos. For example, in response to receiving a user selection of a video including a lecture of graphics and a search query "vector image", process 1200 can identify segments of the video in which "vector image" are mentioned as matching the search query.

In some embodiments, process 1200 can identify video segments that match the search query based on the mood associated with the search query. For example, process 1200 can compare the mood associated with the search query with metadata associated with a video (e.g., a tag indicative of a genre of the video, a mood associated with the video, etc.) and determine whether the video matches the mood associated with the search query.

At 1206, process 1200 can select multiple video segments that match the search query. This selection can be made in any suitable manner. For example, the video segments can be selected in response to a user selection. In a more particular example, the client application can provide a user with an opportunity to select one or more matching video segments by presenting to the user a list of video segments that match the search query and/or any suitable information about the video segments (e.g., descriptions, titles, images, video clips, etc.) using one or more suitable user interfaces. As another example, the video segments can be selected randomly or pseudo-randomly from multiple video segments that are responsive to the search query.

As yet another example, process 1200 can calculate a matching score for each of the matching video segments that are identified at 1204 and can then select a set of matching video segments based on the matching scores. In a more particular example, the subset of the video segments can be selected by ranking the matching video segments by matching score and selecting multiple matching video segments that are associated with the top N highest matching scores. In another more particular example, the subset of matching video segments can be selected by comparing a matching score associated with a matching video segment to a suitable threshold value. More particularly, for example, each of the subset of the video segments can be associated with a matching score that is greater than the threshold value in some embodiments.

In some embodiments, a matching score can be calculated based on any suitable criteria. For example, a matching score associated with a video segment can be calculated based on a relevancy score indicative of a degree to which the video segment matches the search query. In a more particular example, a video segment that includes a greater number of search terms and/or keywords associated with the search query can be regarded as more relevant than a video segment that includes a fewer number of the search terms and/or keywords and can thus be assigned a higher relevancy score. In another more particular example, a video segment that includes the search terms associated with the search query can be regarded as more relevant than a video segment that includes synonyms and/or other keywords that are derived from the search terms. In yet another more particular example, a video segment including a set of keywords and/or search terms with close proximity can be assigned a higher ranking score in some embodiments.

As another example, a matching score associated with a video segment can be calculated based on a popularity score indicative of the popularity of the video segment. In some embodiments, the popularity of a video segment can be measured by click-through-rate, the number of web links associated with the video segment, the number of comments associated with the video segment, and/or any other suitable information.

As yet another example, a matching score associated with a video segment can be calculated based on a recency score associated with the video segment. In a more particular example, a higher matching score can be assigned to a recently published and/or created video segment.

As still another example, a matching score associated with a video segment can be a weighted sum, a weighted average, and/or any other suitable combination of a relevancy score, a popularity score, a recency score, etc. associated with the video segment.

Next, at 1208, process 1200 can generate a composite video based on the set of matching video segments selected at 1206. For example, the composite video can be generated by combining the set of video segments into a video clip. In a more particular example, a first matching video segment can be combined with a second matching video segment by concatenating the last frame of the first matching video segment and the first frame of the second matching video segment, adding a blank frame between the last frame of the first matching video segment and the first frame of the second matching video segment, and/or in any other suitable manner.

In some embodiments, multiple matching video segments responsive to a search query can be combined into a video clip based on the order of the search terms within the search query. For example, process 1200 can rank multiple matching video segments in the order of the search terms corresponding to each of the matching video segments. In a more particular example, for search query "hello, how are you," a matching video segment corresponding to search term "hello" can be assigned a higher ranking than a matching video segment corresponding to search terms "how are you." In some embodiments, a composite video responsive to search query "hello, how are you" can be generated by combining a first video segment containing an utterance of "hello" and a second video segment containing an utterance of "how are you."

At 1210, process 1200 can cause the composite video to be presented to a user. For example, process 1200 can transmit the composite video to a computing device running the client application via one or more response messages. In some embodiments, the response messages can be transmitted to the computing device through a suitable communication protocol, such as the Hypertext Transfer Protocol (HTTP), the File Transfer Protocol (FTP), and/or any other communication protocol. In some embodiments, the response messages can include the composite video, data that can be used to present the composite video (e.g., one or more uniform resource locators (URLs) associated with the composite video, a set of URLs associated with the matching video segments based on which the composite video is generated, presentation time stamps associated with the video segments, HyperText Markup Language (HTML) files, images, scripts, style sheets, audio files, and/or any other suitable data that can be used to present the composite video), and/or any other suitable data.

In some embodiments, the client application can automatically present the composite video on a display (e.g., a display coupled to a computing device 102 of FIG. 1) in response to receiving the response messages. For example, the client application can obtain the composite video or portions of the composite video using one or more URLs associated with the composite video and cause the composite video to be presented using a suitable user interface (e.g., in a playback window 710 of interface 700 as shown in FIG. 7).

Alternatively, the client application can present to a user information about the composite video and/or the matching video segments contained in the composite video, such as a thumbnail representative of the composite video, a snippet representative of the composite video, a link or uniform resource locator (URL) to the composite video, etc. The client application can then present the composite video to the user in response to receiving a user request to present the composite video (e.g., a user selection of a "play" button using a suitable input device, a voice command of "play," etc.).

At 1212, process 1200 can determine whether a request to generate an updated search result responsive to the search query has arrived. In some embodiments, a request to generate an updated search result can correspond to a user selection of a "refresh" button 730 of interface 700 as described above in connection with FIG. 7.

In some embodiments, process 1200 can return to 1206 in response to receiving a request to generate an updated search result. In some embodiments, process 1200 can select an updated set of matching video segments from the matching video segments that are identified at 1204 and can then generate an updated composite video based on the updated set of matching video segments. In some embodiments, the updated set of matching video segments may or may not contain one or more of the set of matching video segments that are selected to generate the composite video.

In some embodiments, process 1200 can return to 1202 in response to determining that a request to generate an updated composite video has not arrived.

Figure 13:
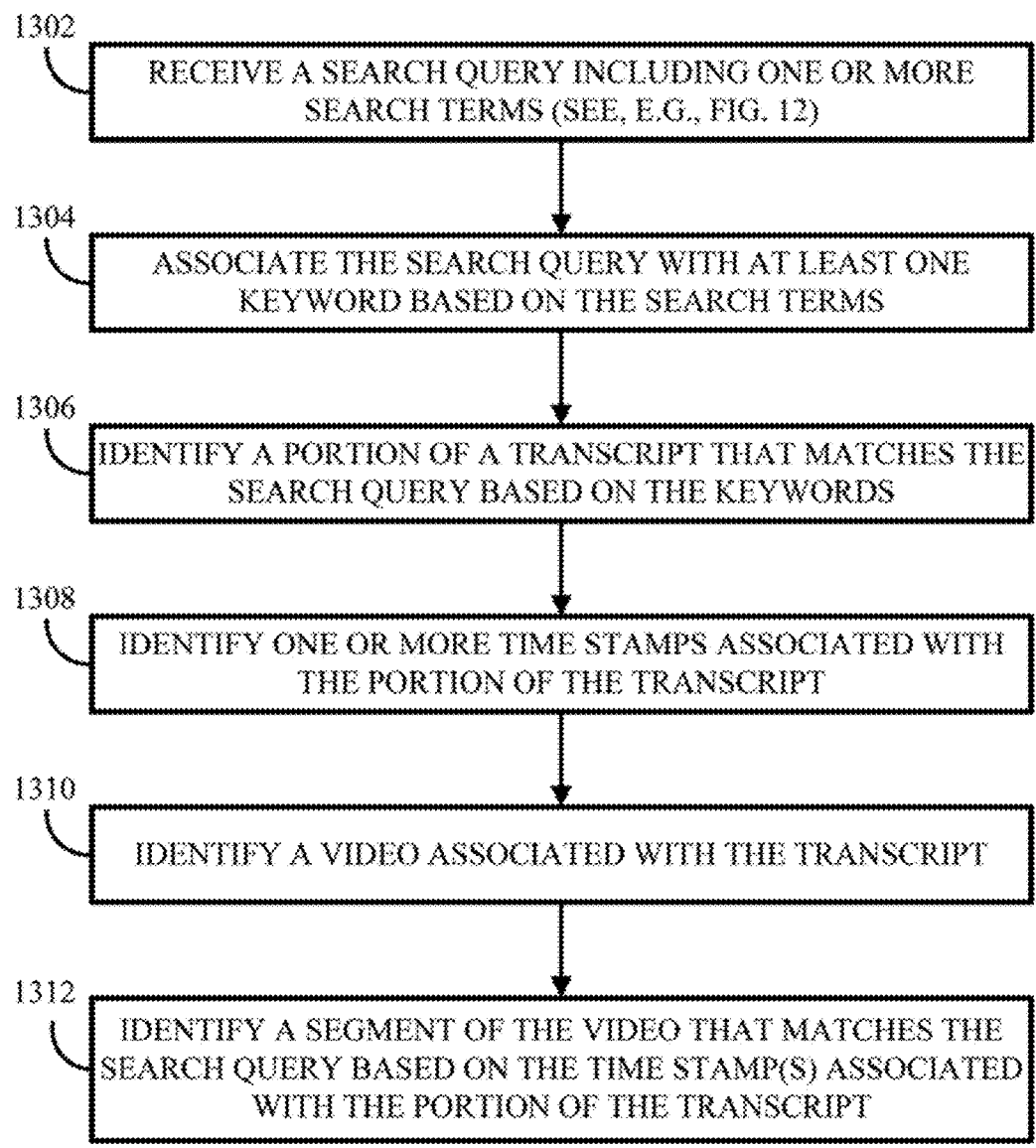
FIG. 13 shows an illustrative example of a process for searching for video content in accordance with the embodiments of the disclosed subject matter.

Turning to FIG. 13, an illustrative example 1300 of a process for searching for video segments that match a search query is shown in accordance with some embodiments of the disclosed subject matter. In some embodiments, process 1200 can be implemented by a hardware processor of one or more suitable components of system 100, such as a server 108.

As shown, process 1300 can begin by receiving a search query at 1302. For example, a search query can be received and parsed into one or more search terms as described above in connection with FIG. 12.

At 1304, process 1300 can associate the search query with one or more keywords. For example, each of the search terms of the search query can be identified as a keyword that is associated with the search query. In a more particular example, search query "hello, how are you doing" can be associated with keywords "hello," "how are you," "how are you doing," etc. In another more particular example, search query "a more perfect union" can be associated with keywords "perfect," "union," "perfect union," etc. As another example, process 1300 can include a synonym, and/or an acronym of one or more of the search terms and/or any other suitable terms that relate to the search terms.

At 1306, process 1300 can search for a portion of a transcript that matches the search query. For example, process 1300 can access a database that stores a collection of transcripts associated with a collection of videos (e.g., a transcript database 110 of FIG. 1) and identify a portion of a transcript that matches the search query. As another example, process 1300 can receive a user selection of one or more videos (e.g., a set of videos published on a channel of a video sharing service) and identify portions of the transcripts associated with the videos that match the search query.

In some embodiments, a portion of a transcript can be regarded as a match to a search query when the portion of the transcript contains one or more keywords associated with the search query. For example, a portion of a transcript that matches search query "hello, how are you doing" can include one or more occurrences of "hello," "how are you," "how are you doing," "hello, how are you," "hello, how are you doing," "how," "are," "you," and/or any other suitable combination of the keywords associated with search query "hello, how are you doing." As another example, a portion of a transcript that matches search query "a more perfect union" can include one or more occurrences of "a more perfect union," "perfect union," "perfect our union," and/or any other suitable combination of the keywords associated with search query "a more perfect union."

Next, at 1308, process 1300 can identify one or more time stamps associated with the portion of the transcript. In some embodiments, the time stamps can include a time stamp that indicates the time that a word in the portion of the transcript that is spoken in a video, a time stamp that indicates the start of the presentation of a video segment corresponding to the portion of the transcript, a time stamp that indicates the end of the presentation of the video segment, and/or any other suitable time stamps associated with the portion of the transcript.

At 1310, process 1300 can identify a video associated with the portion of the transcript. For example, process 1300 can access an indexing system that indexes a collection of videos by transcript (e.g., an audio indexing system as described in connection with FIG. 1). Process 1300 can then identify the video that is associated with the transcript by mapping the transcript to the video.

At 1312, process 1300 can identify a segment of the video that matches the search query based on the time stamps associated with the portion of the transcript. For example, process 1300 can identify a first frame and a second frame of the video corresponding to a time stamp representative of a start time of the portion of the transcript and a time stamp representative of an end time of the portion of the transcript, respectively. Process 1300 can then identify a segment of the video including the first frame and the second frame as a video segment corresponding to the portion of the transcript. In a more particular example, the boundaries of the segment of the video can be defined by the first frame and the second frame. In another more particular example, the segment of the video can include a set of video frames corresponding to a video scene that includes the first frame and the second frame.

It should be noted that the above steps of the flow diagrams of FIGS. 12-13 can be executed or performed in any order or sequence not limited to the order and sequence shown and described in the figure. Also, some of the above steps of the diagrams of FIGS. 12-13 can be executed or performed substantially simultaneously where appropriate or in parallel to reduce latency and processing times. Furthermore, it should be noted that diagrams of FIGS. 12-13 are provided as examples only. At least some of the steps shown in these figures may be performed in a different order than represented, performed concurrently, or altogether omitted.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for searching for video content are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is limited only by the claims that follow. Features of the disclosed embodiments can be combined and rearranged in various ways.

What is claimed is:

1. A system for searching for video content, the system comprising:
    at least one hardware processor that is configured to:
        receive a search query including a plurality of search terms;
        identify, from a collection of video content items, a plurality of video content items responsive to the plurality of search terms in the received search query, wherein each video content item of the plurality of video content items comprises an audio segment that contains the plurality of search terms;
        select a first subset of video segments from the plurality of video content items, wherein each video segment of the first subset of video segments comprises an audio segment that contains the plurality of search terms;
        generate a first composite video that concatenates the first subset of video segments such that the first composite video includes multiple video segments that each include the plurality of search terms;
        present a user interface that includes the first composite video for selection and a regeneration interface element;
        in response to receiving a selection of the regeneration interface element presented in the user interface, select a second subset of video segments from the plurality of video content items, wherein each video segment of the second subset of video segments comprises an audio segment that contains the plurality of search terms, wherein the second subset of video segments selected from the plurality of video content items is different than the first subset of video segments selected from the plurality of video content items;
        generate a second composite video that concatenates the second subset of video segments; and
        update the user interface to present the second composite video and the search query.

2. The system of claim 1, wherein each video content item of the plurality of video content items is associated with a transcript that includes the plurality of search terms.

3. The system of claim 1, wherein each video segment of the first subset of video segments and each video segment of the second subset of video segments is associated with a matching score based on a relevancy score indicative of a degree to which a video segment matches the plurality of search terms in the search query, a popularity score of a video content item in which the video segment is contained, and a recency score of the video content item.

4. The system of claim 3, wherein the second subset of video segments is selected based at least in part on the matching score.

5. The system of claim 1, wherein the hardware processor is further configured to:
    associate the search query with a plurality of keywords based at least in part on the plurality of search terms;
    identify a portion of a transcript that includes the plurality of keywords;
    identify a first time stamp that is associated with the portion of the transcript;
    identify a video content item associated with the transcript; and
    identify a segment of the video content item based at least in part on the first time stamp.

6. The system of claim 5, wherein the hardware processor is further configured to:
    identify a second time stamp that is associated with the portion of the transcript; and
    identify the segment of the video content item based at least in part on the second time stamp, wherein the first time stamp corresponds to a start time of the segment of the video content item and wherein the second time stamp corresponds to an end time of the segment of the video content item.

7. The system of claim 1, wherein the hardware processor is further configured to randomly select a subset of video segments from the first subset of video segments.

8. A method for searching for video content, the method comprising:
    receiving, using a hardware processor, a search query including a plurality of search terms;
    identifying, using the hardware processor, from a collection of video content items, a plurality of video content items responsive to the plurality of search terms in the received search query, wherein each video content item of the plurality of video content items comprises an audio segment that contains the plurality of search terms;
    selecting, using the hardware processor, a first subset of video segments from the plurality of video content items, wherein each video segment of the first subset of video segments comprises an audio segment that contains the plurality of search terms;
    generating, using the hardware processor, a first composite video that concatenates the first subset of video segments such that the first composite video includes multiple video segments that each include the plurality of search terms;
    presenting, using the hardware processor, a user interface that includes the first composite video for selection and a regeneration interface element;
    in response to receiving a selection of the regeneration interface element presented in the user interface, selecting, using the hardware processor, a second subset of video segments from the plurality of video content items, wherein each video segment of the second subset of video segments comprises an audio segment that contains containing the plurality of search terms, wherein the second subset of video segments selected from the plurality of video content items is different than the first subset of video segments selected from the plurality of video content items;

generating, using the hardware processor, a second composite video that concatenates the second subset of video segments; and updating, using the hardware processor, the user interface to present the second composite video and the search query.

9. The method of claim 8, wherein each video content item of the plurality of video content items is associated with a transcript that includes the plurality of search terms.

10. The method of claim 8, wherein each video segment of the first subset of video segments and each video segment of the second subset of video segments is associated with a matching score based on a relevancy score indicative of a degree to which a video segment matches the plurality of search terms in the search query, a popularity score of a video content item in which the video segment is contained, and a recency score of the video content item.

11. The method of claim 10, wherein the second subset of video segments is selected based at least in part on the matching score.

12. The method of claim 8, further comprising:
associating the search query with a plurality of keywords based at least in part on the plurality of search terms;
identifying a portion of a transcript that includes the plurality of keywords;
identifying a first time stamp that is associated with the portion of the transcript;
identifying a video content item associated with the transcript; and
identifying a segment of the video content item based at least in part on the first time stamp.

13. The method of claim 12, further comprising:
identifying a second time stamp that is associated with the portion of the transcript; and
identifying the segment of the video content item based at least in part on the second time stamp, wherein the first time stamp corresponds to a start time of the segment of the video content item and wherein the second time stamp corresponds to an end time of the segment of the video content item.

14. The method of claim 8, further comprising randomly selecting a subset of video segments from the first subset of video segments.

15. A non-transitory computer-readable medium containing computer-executable instructions that, when executed by a processor, cause the process to perform a method for searching for video content, the method comprising:
receiving a search query including a plurality of search terms;
identifying, from a collection of video content items, a plurality of video content items responsive to the plurality of search terms in the received search query, wherein each video content item of the plurality of video content items comprises an audio segment that contains the plurality of search terms;
selecting a first subset of video segments from the plurality of video content items, wherein each video segment of the first subset of video segments comprises an audio segment that contains the plurality of search terms;

generating a first composite video that concatenates the first subset of video segments such that the first composite video includes multiple video segments that each include the plurality of search terms;
presenting a user interface that includes the first composite video for selection and a regeneration interface element;
in response to receiving a selection of the regeneration interface element presented in the user interface, selecting a second subset of video segments from the plurality of video content items, wherein each video segment of the second subset of video segments comprises an audio segment that contains the plurality of search terms, wherein the second subset of video segments selected from the plurality of video content items is different than the first subset of video segments selected from the plurality of video content items;
generating a second composite video that concatenates the second subset of video segments; and
updating the user interface to present the second composite video and the search query.

16. The non-transitory computer-readable medium of claim 15, wherein each video content item of the plurality of video content items is associated with a transcript that includes the plurality of search terms.

17. The non-transitory computer-readable medium of claim 15, wherein each video segment of the first subset of video segments and each video segment of the second subset of video segments is associated with a matching score based on a relevancy score indicative of a degree to which a video segment matches the plurality of search terms in the search query, a popularity score of a video content item in which the video segment is contained, and a recency score of the video content item.

18. The non-transitory computer-readable medium of claim 17, wherein the second subset of video segments is selected based at least in part on the matching score.

19. The non-transitory computer-readable medium of claim 15, wherein the method further comprises:
associating the search query with a plurality of keywords based at least in part on the plurality of search terms;
identifying a portion of a transcript that includes the plurality of keywords;
identifying a first time stamp that is associated with the portion of the transcript;
identifying a video content item associated with the transcript; and
identifying a segment of the video content item based at least in part on the first time stamp.

20. The non-transitory computer-readable medium of claim 19, wherein the method further comprises:
identifying a second time stamp that is associated with the portion of the transcript; and
identifying the segment of the video content item based at least in part on the second time stamp, wherein the first time stamp corresponds to a start time of the segment of the video content item and wherein the second time stamp corresponds to an end time of the segment of the video content item.

21. The non-transitory computer-readable medium of claim 15, wherein the method further comprises randomly selecting a subset of video segments from the first subset of video segments.

* * * * *